Feb. 17, 1925.　　　　　　　　　　　　　　　　1,527,139
L. ILLMER
FUEL PUMP FOR INTERNAL COMBUSTION ENGINES
Filed May 4, 1922　　　　3 Sheets-Sheet 1
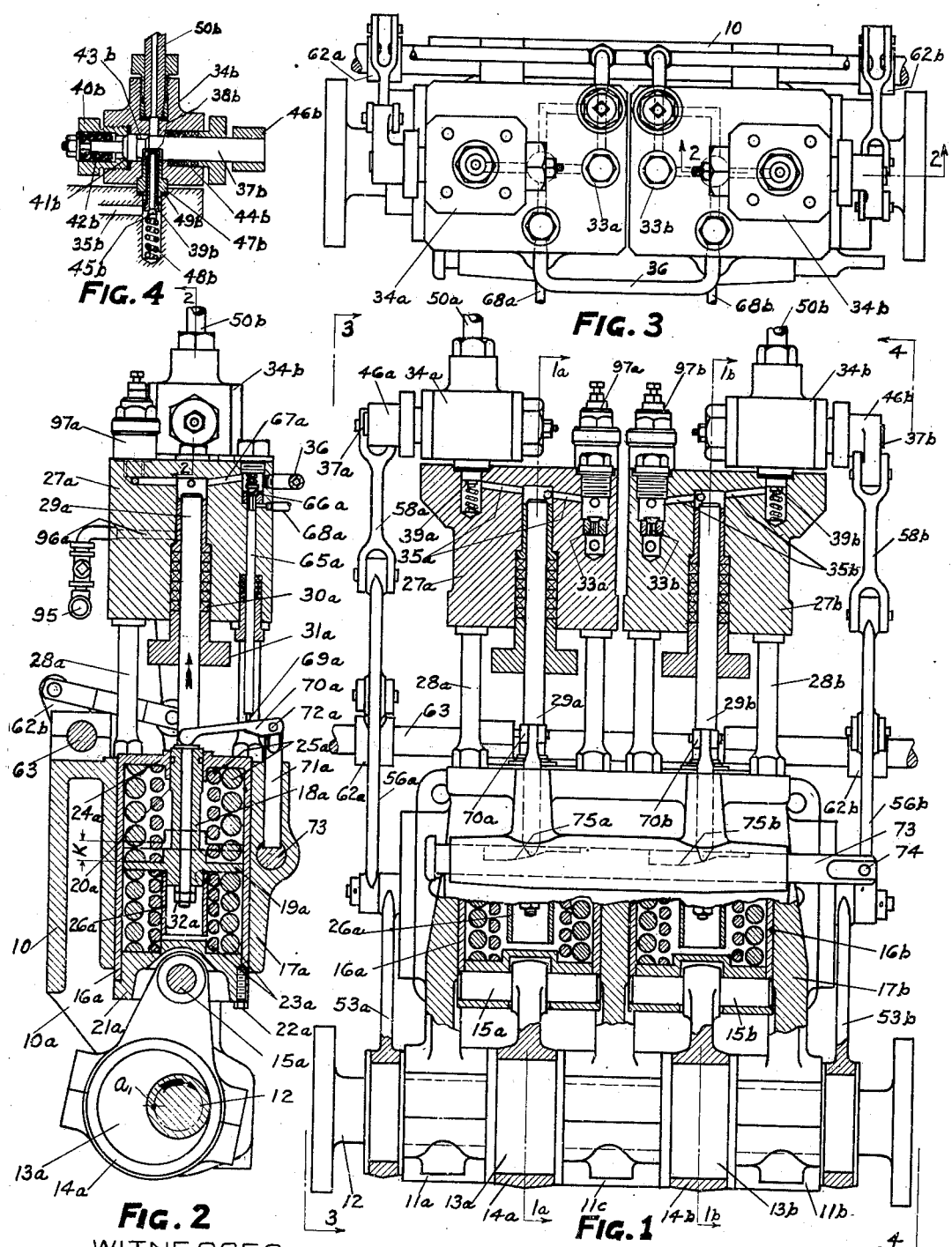
WITNESSES:
M. E. Alexy
W. B. Caruthers
INVENTOR
Louis Illmer Feb. 17, 1925.

L. ILLMER 1,527,139

FUEL PUMP FOR INTERNAL COMBUSTION ENGINES

Filed May 4, 1922   3 Sheets-Sheet 2

WITNESSES:
M. E. Alexy
W. B. Caruthers

INVENTOR
Louis Illmer.

Feb. 17, 1925.
L. ILLMER
1,527,139
FUEL PUMP FOR INTERNAL COMBUSTION ENGINES
Filed May 4, 1922
3 Sheets-Sheet 3

WITNESSES:
M. E. Alexy
W. B. Caruthers

INVENTOR
Louis Illmer

Patented Feb. 17, 1925.

1,527,139

UNITED STATES PATENT OFFICE.

LOUIS ILLMER, OF CORTLAND, NEW YORK.

FUEL PUMP FOR INTERNAL-COMBUSTION ENGINES.

Application filed May 4, 1922. Serial No. 558,523.

*To all whom it may concern:*

Be it known that I, LOUIS ILLMER, a citizen of the United States, and a resident of Cortland, in the county of Cortland and the State of New York, have invented certain new and useful Improvements in Fuel Pumps for Internal-Combustion Engines, of which the following is a specification.

My invention relates particularly to improvements in high pressure injection pumps for so-called solid-injection liquid fuel engines, and its object is to provide a device which will maintain an exceptionally high injection velocity through the spray nozzle of such internal combustion engines regardless of the engine speed and without the need of compressed air for fuel injection purposes.

This object is primarily attained by the use of an elastic or impulsion drive for the pump plunger which serves to accelerate the plunger at the time of injection so as to break up the liquid into a finely atomized state and to allow of rapidly and perfectly mixing such pulverized fuel with all the combustion air available in the power cylinder of the engine.

The direct injection fuel pump herein described is especially designed to work under exceptionally high hydraulic pressure such as required for successfully burning the heaviest grades of fuel oil, such as common boiler oils.

In order that this condition may be met to the best advantage, the plunger of my fuel pump is provided with an impulsion drive which is made to work in conjunction with the plunger displacement produced by its rigid actuating gear, to the end that the pump delivery to the engine cylinder is in part made up by the impulsion "kick" displacement and in part by the plunger movement imparted by the actuating gear.

The plunger drive eccentric used to reciprocate the rigid actuating member of the pump is preferably set in an approximate quadrature relation to the engine crank which this pump serves, since this allows of attaining the maximum gear velocity for the plunger when the pump begins delivering fuel to the engine cylinder. The impulsion drive then superimposes an augmented movement over that which the actuating gear alone is capable of imparting to the plunger.

In the present system of fuel injection, all pump valves remain closed during the first portion of each discharge stroke of the plunger actuating gear, and during this time impulsion energy is stored within the elastic plunger drive and a high initial pressure is at the same time set up within the pump chamber. Such energy stored behind the plunger is subsequently released by a positively opened discharge valve which then allows fuel to be sent forth to the engine cylinder. Thereupon the impulsion drive rapidly accelerates the relatively slow movement imparted to the plunger by the actuating gear and the instant the initial pump chamber pressure tends to drop, this support on part of the elastic drive element serves to maintain a nearly uniform pressure behind the spray nozzle during the injection period.

In order to make reversible a fuel pump working with said quadrature eccentric setting, a further object of the present invention is to provide means for cross-connecting and suitably controlling a set of the described pumps so that these may be utilized for delivering fuel to the respective power cylinders in both the forward and the reverse running directions of a multicylinder oil engine.

Embodied herein are also improvements in high pressure discharge valves for said pumps and in a simplified reverse gear therefor. The pump unit used for this purpose comprises essentially a set of separate pumps operated from opposed plunger eccentrics and each such pump is provided with a set of forward and reverse discharge valves, respectively. In mid gear or stop position of the reverse control link, both sets of said discharge valves are kept closed and no oil is allowed to enter the engine cylinders. When the reverse link is thrown into either its forward or its reverse position, the corresponding discharge valves of the pumps are thereby actuated, and this causes properly timed fuel to be successively injected into the cylinders for the selected running direction of the engine.

The present invention furthermore includes certain co-ordination of the pipe connections and other parts required for reversing said fuel pumps, and comprises various other features of structure and organization, all of which will be set forth in detail hereinafter.

Reference is had to the accompanying three sheets of drawings which illustrate an example of the preferred form of my invention; like characters of reference indicate like parts in the several views, and in which drawings:

Fig. 1 is an elevational front view of a twin or double plunger fuel pump equipt with separately actuated forward and reverse discharge valves.

Fig. 2 is an elevational view of the assembled pump in section as taken along the line 1$^a$—1$^a$ of Fig. 1.

Fig. 3 is a top or plan view of Fig. 1.

Fig. 4 represents a sectional detail of the mechanically operated discharge valve of the pump as taken along the line 2—2 of Fig. 2.

Figure 7:
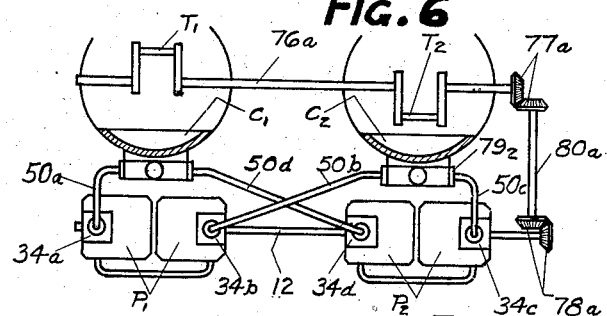
Figure 7A:
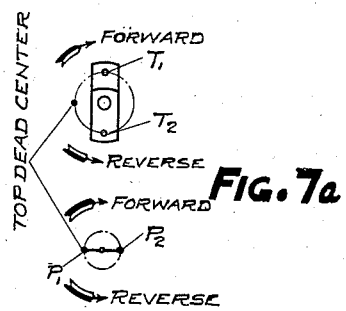

Fig. 7 diagrammatically represents a set of fuel pumps units arranged for operating multiple power cylinders as applied to a two-stroke oil engine.

Fig. 7$^a$ shows a detail of the phase relation between the pump plunger eccentric settings and that of the engine cranks used in Fig. 7.

Figure 8:
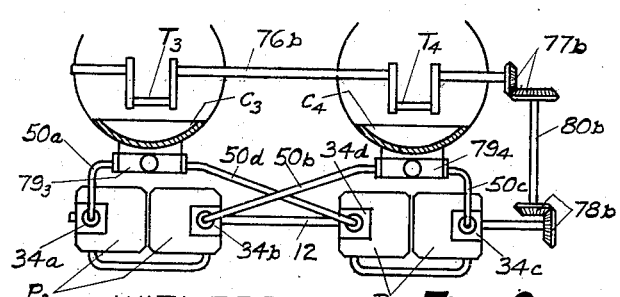
Figure 8A:
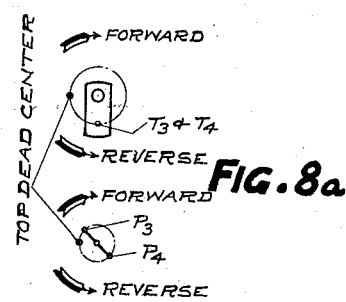

Fig. 8 diagrammatically represents a set of fuel pump units arranged for operating multiple power cylinders as applied to a four-stroke oil engine.

Fig. 8$^a$ shows a detail of the phase relation between the pump plunger eccentric settings and that of the engine cranks used in Fig. 8.

Figure 9:
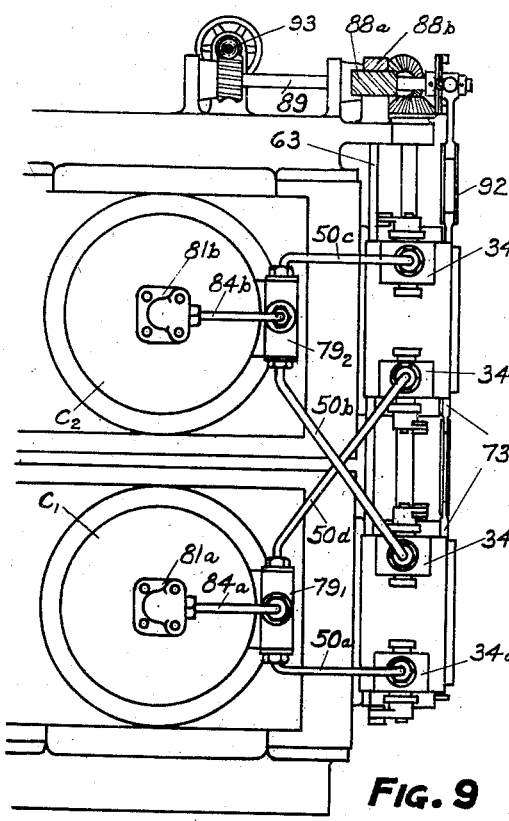

Fig. 9 is a partial plan view of a two-stroke multi-cylinder oil engine equipt with a set of my fuel pumps, showing the distributing pipe connections and other assembled parts.

Figure 10:
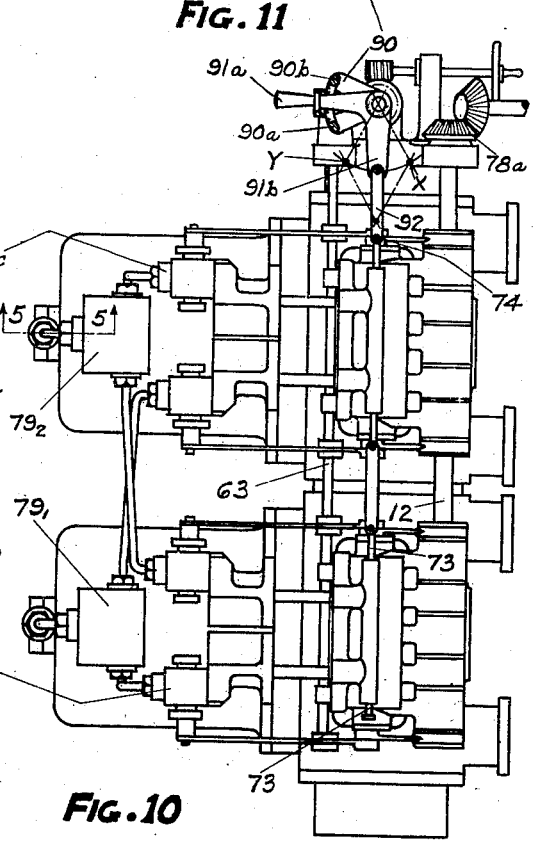

Fig. 10 is an elevational front view of Fig. 9.

Figure 11:
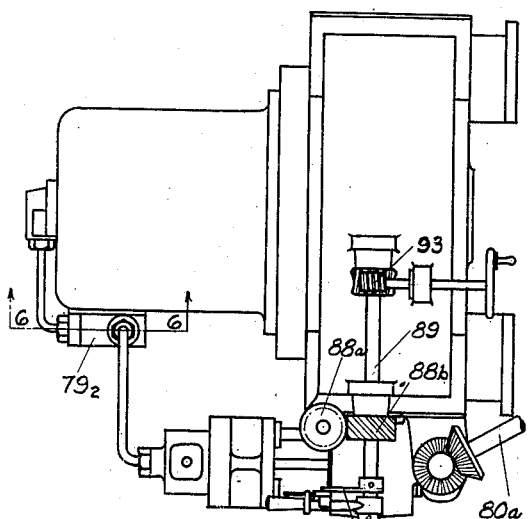

Fig. 11 is an elevational end view of Fig. 9.

Figure 12:
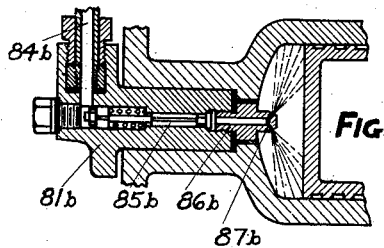

Fig. 12 represents a sectional detail of the spray nozzle and its relation to the engine cylinder, as taken along the line 5—5 of Fig. 10.

Figure 13:
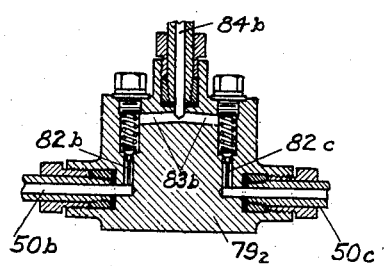

Fig. 13 represents a sectional detail of the check-valve block, as taken on the line 6—6 of Fig. 11.

Referring now to Figs. 1 and 2, the numeral 10 represents a flanged pump bracket which may be fastened to any convenient part of the engine. This bracket is provided with several projecting ribs such as 10$^a$, carrying the split bearings 11$^a$, 11$^b$, and 11$^c$, in which is mounted the drive shaft 12. This shaft is intended to be driven from the engine crankshaft and mounted upon said shaft are two eccentrics 13$^a$ and 13$^b$ having their throws aligned and set alike, such that Fig. 2 may be taken to represent a sectional view through either the line 1$^a$—1$^a$ or the line 1$^b$—1$^b$.

The eccentric straps 14$^a$ and 14$^b$ engage respectively with the wrist pins 15$^a$ and 15$^b$ and serve to impart reciprocating movement respectively to the similar spring casings 16$^a$ and 16$^b$. These casings are mounted in independent guide bores 17$^a$ and 17$^b$ respectively, which bores are preferably made integral with the bracket casting 10. The said casings together with the parts enclosed within same are of identical construction and as will be more fully pointed out hereinafter, these casings drive independent plungers mounted in separate pump blocks which are cross-connected in such fashion as to function as a single pump.

As is best shown in Fig. 2, the casing 16$^a$ encloses a plunger drive part 18$^a$ having an integral flanged part 19$^a$ and also a guide collar part 20$^a$, all slidably mounted with respect to the casing 16$^a$. Thrusting between the flange 19$^a$ and the inserted casing cover 21$^a$, (which latter part is securely fastened to the casing 16$^a$ by means of a number or lock screws such as 22$^a$), is a nest of relatively powerful primary springs 23$^a$. Mounted above the drive flange 19$^a$ and thrusting against an internal flange 24$^a$ of the casing 16$^a$, is a nest of secondary springs 25$^a$, which latter springs are set to act in opposition to the primary springs 23$^a$.

These opposed drive springs are intended to be forced into place under a considerable initial tension so that the drive flange 19$^a$ is normally made to assume the relatively fixed balanced position with respect to the casing that is indicated by dotted lines in Fig. 2. When however, the plunger 29$^a$ works against a high pump chamber pressure and becomes fully loaded, the drive flange 19$^a$ then assumes its extreme lower or full-lined position shown in Fig. 2.

The eccentric parts 13$^a$, 14$^a$, 15$^a$ and including the casing 16$^a$ with its flanges 21$^a$ and 24$^a$, constitute the rigid actuating gear members of this impulsion fuel pump, while the intermediate resilient members 23$^a$ and 25$^a$ acting on the parts 19$^a$ and 20$^a$ serve as the impulsion drive for the pump plunger 29$^a$.

The extent to which the drive flange 19$^a$ is intended to be displaced out of its balanced position with respect to the casing is designated in Fig. 2, by the distance "K". When this flange is thus fully displaced, the primary spring 23$^a$ will be carrying substantially its maximum expected plunger load, while the secondary spring 25$^a$ will be almost wholly expanded but will still retain a small portion of its initial counter thrust. In the described lower position of the flange 19$^a$, its tubular stop 26$^a$ will be brought into close proximity with the shoulder formed upon the casing cover 21$^a$ so that this stop may protect the primary spring from overload The pump block 27$^a$, which is independent of but similar to the block 27$^b$, is preferably made of machinery steel and securely fastened to the guide bore part 17$^a$ by means of a number of stanchions 28$^a$. Within this block is mounted the reciprocating plunger 29$^a$ which is suitably sealed against leakage by the packing 30$^a$ and this packing may be adjusted by means of the gland 31$^a$. The plunger is intended to work reasonably free through said packing so as not to interfere unduly with the action of the impulsion drive springs. The plunger is fastened into the drive part 18$^a$ by means of the shank nut 32$^a$ so as virtually to become an integral part thereof.

As is best shown in Fig. 1, each of said pump blocks is provided with an automatic suction valve 33$^a$ and 33$^b$ respectively. A common supply pipe 95 feeds these suction valves under a slight pressure through separate passages, such as 96$^a$ indicated for the block 27$^a$ in Fig. 2. Protection for the pump blocks against excessive pressure is afforded by the independent relief valves 97$^a$ and 97$^b$, which are intended to communicate freely with their respective pump chambers through drilled passages such as are indicated in Fig. 2. In the present invention, these relief valves perform no part in the functioning of the pumps other than to serve as a safety device.

The pump blocks are further provided with the respective discharge valve blocks 34$^a$ and 34$^b$, either of which independently controls the delivery for the combined displacement of the two pump plungers 29$^a$ and 29$^b$, as will appear presently. The suction valve 33$^a$ communicates directly with both the plunger 29$^a$ and the discharge valve block 34$^a$ through the aligned passage 35$^a$ drilled in the block 27$^a$ which passage constitutes the pump chamber for this block. In a similar manner, the suction valve 33$^b$ communicates directly with both its plunger 29$^b$ and the discharge valve block 34$^b$ through the aligned passage 35$^b$ drilled in the block 27$^b$. The pump chamber 35$^a$ is placed into direct communication with the pump chamber 35$^b$ through the cross connecting pipe 36, by means of which both plungers may deliver through either of the discharge valve blocks 34$^a$ or 34$^b$.

These discharge valve blocks are of similar construction, and as is best shown in Fig. 4, they are preferably of the check valve type with the discharge valve disposed to open inwardly into the pump chamber against pressure. Within the block 34$^b$, an actuating spindle or rockshaft 37$^b$ is mounted and this is preferably slotted to constitute the lip 38$^b$ so as to engage with the free end of the stem of the discharge valve 39$^b$. To one side of said lip, the spindle 37$^b$ is enlarged into a shoulder part carrying the ground annular seat 41$^b$ which bears against the spindle nut 40$^b$ to make a rotatable hydraulic joint therewith. A spring 42$^b$ serves to maintain an initial pressure on the seat 41$^b$ while the small annular recess 43$^b$ formed behind the enlarged spindle shoulder serves to pass the liquid fuel around said spindle and at the same time allows the pump discharge pressure to exert a lateral spindle thrust against the seat 41$^b$ for the purpose of sealing same.

To the other side of the lip 38$^b$, the actuating spindle is sealed by means of a hydraulic packing 44$^b$. The outer or free end of the spindle 37$^b$ carries a lever arm 46$^b$ for the purpose of oscillating the spindle and thereby periodically opening the pump discharge valve 39$^b$.

As shown in detail in Fig. 4, such discharge valve is preferably provided with a concentric pilot valve 45$^b$ mounted within and seating upon the main valve 39$^b$, the stem of the pilot valve being slightly longer than the surrounding tubular stem of the main valve. Thus when the lip 38$^b$ successively engages with the free ends of these concentric valve stems, it will strike open the smaller pilot valve 45$^b$ against pump chamber pressure in advance of picking up the main valve 39$^b$. Each of these valves is intended to be provided with suitable passages through their stem parts to meet the needs of the pump delivery. It will be apparent that the partial equalization of pressure caused by the prior opening of the pilot valve serves to materially reduce the actuating force otherwise required to open the larger main discharge valve against high hydraulic pressure.

Figure 6:
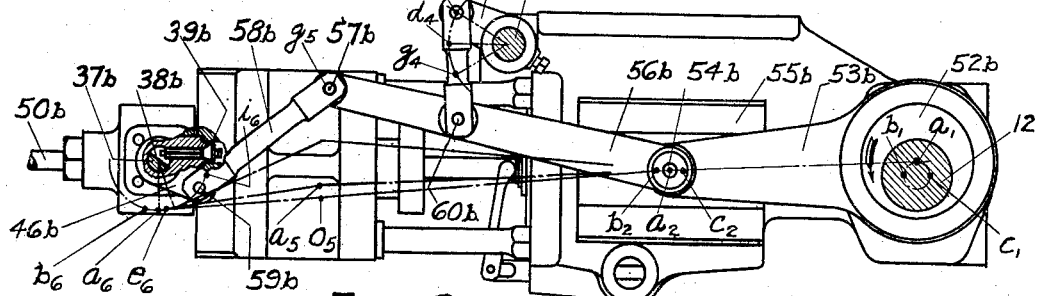
Fig. 6 is an opposite side view of the pump as seen from the line 4—4 of Fig. 1 and shows the toggle gear for the reverse discharge valve as shifted into its idling position.

As is best shown in partial section in Fig. 6, the axis of the main discharge valve and that of its concentric pilot valve is intended to be offset somewhat from the axis of the actuating spindle 37$^b$ so that the oscillatory movement imparted to said spindle may cause the lip 38$^b$ to periodically open said valves in the manner described. The spring 48$^b$ thrusting against the head of the pilot valve 45$^b$ normally seats both the pilot and the main discharge valve when not engaged with the spindle lip 38$^b$.

It may be here noted that the oscillatory movement given to the spindle 37$^b$ is without displacement effect upon the pump plunger delivery and that the inverted check type of discharge valve is particularly effective in insuring a tight joint against high chamber pressure.

As is further shown in Fig. 4, the main discharge valve $39^b$ is mounted within a seat part $47^b$ which is suitably bolted to the pump block $27^b$ and packed against leakage by means of the gasket $49^b$ so as to constitute a breakable hydraulic joint. As stated, the discharge valve $39^b$ is placed in communication with its plunger through the passage $35^b$, and upon opening of said discharge valve liquid fuel will therefore be delivered to the discharge pipe $50^b$ through the annular passage $43^b$ formed around the spindle $37^b$.

As will be pointed out more fully presently, the discharge pipe $50^b$ leads directly to the spray nozzle of the power cylinder. One of the discharge blocks such as $34^a$, is used for forward running of the engine while the other such as $34^b$, is used for the reverse running of the engine. These valves are independently timed and controlled by means of separate actuating gears as is best shown in Figs. 5 and 6.

Figure 5:
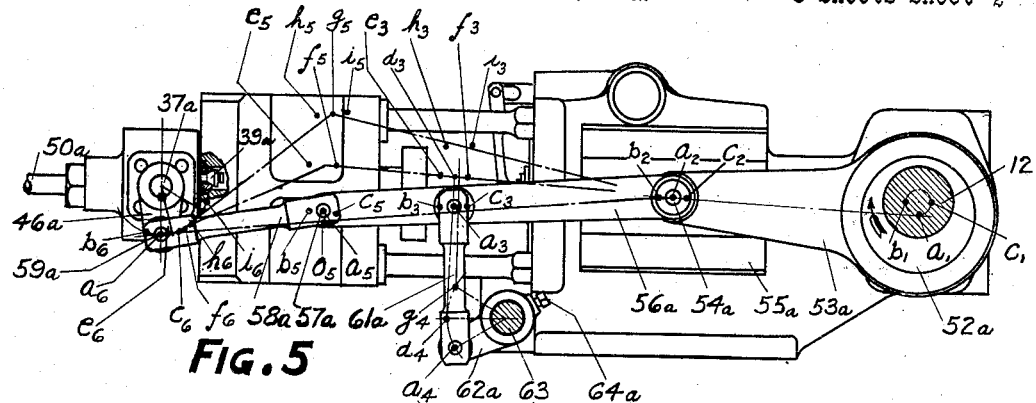
Fig. 5 is an elevational side view of the pump illustrating the toggle gear linkage used for the ahead discharge valve shifted into its actuating position, as seen from the line 3—3 of Fig. 1.

Referring first to Fig. 5, showing a toggle linkage for actuating the valve block $34^a$, the eccentric $52^a$ is preferably set in approximate alignment with the plunger eccentrics and is mounted on the pump drive shaft 12, while its strap $53^a$ engages with the wrist pin $54^a$ as guided by the slide shoe $55^a$. Also mounted upon the reciprocating pin $54^a$ is a toggle arm $56^a$ provided at its other free end with a pin $57^a$ to which is joined the toggle link $58^a$. This link is in turn guided at its upper end by the pin $59^a$ which is carried by the spindle rocker arm $46^a$ actuating the discharge valve spindle $37^a$.

The toggle arm $56^a$ is further provided with a guide pin $60^a$ to which is fastened the guide link $61^a$ which is positioned by the throw arm $62^a$ mounted upon the throw shaft 63. This latter shaft runs parallel with the pump drive shaft 12 and is intended to carry a plurality of similar throw arms so as to simultaneously constrain and hold in position the different toggle linkages that may be used to actuate any number of similar fuel pumps.

Using letters of the alphabet to designate certain critical positions assumed by the valve gear and denoting the corresponding positions for any one toggle pin by means of similar subnumerals for such letters, Fig. 5, shows the gear eccentric $52^a$ in its mid stroke position $a_1$ running in the direction indicated by the arrow. When the throw arm $62^a$ is held in its forward running position $a_4$, the intermediate toggle pin $57^a$ will assume the mid position $a_5$ while the spindle arm pin $59^a$ takes the position $a_6$, all of which relations are shown by the full lined toggle positions.

When the gear eccentric $52^a$ comes into said critical position $a_1$, the spindle lip $38^a$ (not shown but similar to the described lip $38^b$) is normally intended to engage with the stem of the main discharge valve $39^a$. Hence by the time that the eccentric reaches its inner dead center position $b_1$, the guide pin $60^a$ will then assume the uppermost position $b_3$ while the arm pin $59^a$ moves the actuating spindle $37^a$ into its corresponding uppermost position $b_6$, thus fully opening the main discharge valve $39^a$.

When during the downward or return stroke of the toggle linkage, the eccentric $52^a$ reaches its outer dead center position $c_1$, the spindle arm $46^a$ will then be drawn into its lowest forward running position $c_6$, thus in the meantime letting the valve $39^a$ return to its seat as the spindle arm $46^a$ again passes its critical position $a_6$. It will be seen therefore, that while the throw arm $62^a$ is held in its forward running position $a_4$, for which the toggle linkage is thrown into approximate alignment as shown full in Fig. 5, this setting of the valve gear will periodically open the discharge valve $39^a$ against chamber pressure in synchronism with the plunger movements.

When however, the arm $62^a$ is thrown into its mid gear position $d_4$, this will shift the guide pin $60^a$ into the corresponding mid position $d_3$ and thus cause the eccentric $52^a$ to reciprocate the guide pin $60^a$ between the changed limits $e_3$ and $f_3$. In the meantime the intermediate toggle pin $57^a$ will be moving between the positions $e_5$ and $f_5$, which in turn pulls down the spindle arm $46^a$ so as to oscillate between the limits $e_6$ and $f_6$. It will be noted that the highest position $e_6$ now reached by the pin $59^a$ is purposely kept below the critical position $a_6$ of the arm $46^a$, thus preventing the lip $38^a$ from opening the pump discharge valve, notwithstanding that the eccentric $52^a$ may still be imparting its full stroke movement to the wrist pin $54^a$.

In case that the throw arm $62^a$ should be shifted still further over into its reverse running position $g_4$, this will cause the guide pin $60^a$ to travel within the limits $h_3$ to $i_3$, with the result that the spindle arm $46^a$ will now be made to oscillate between the limits $h_6$ and $i_6$, and while operating in such idling position, the valve $39^a$ will not at any time be opened by the valve gear.

The linkage relations for the gear set in its reverse or idling position are represented by full lines in Fig. 6, which shows a valve gear of opposite hand as required for operating the reverse valve block $34^b$. The mechanism is identical with that shown in Fig. 5, except that the arm $46^b$ is reversed while the eccentric $52^b$ is preferably set to align with the throw setting of the plunger eccentrics $13^a$ and $13^b$.

For the respective valve gear positions shown in Figs. 5 and 6, the common throw shaft 63, when thrown into either of its extreme forward or reverse positions, will cause one of the toggle linkages to be shifted into its aligned or actuating position while the other of said toggle linkages will then be shifted out of alignment into its idling position. When however, the throw shaft is placed into its mid gear position $d_4$, neither of the pilot valves $45^a$ or $45^b$ nor the main discharge valves $39^a$ or $39^b$, will be opened. Thus in view of the described interconnection of the two pump chambers through the pipe 36, it will be seen that by proper adjustment of the throw shaft 63, both of the pump plungers $19^a$ and $19^b$ may at will be made to deliver through either one or the other of the discharge pipes $50^a$ or $50^b$. while when the throw shaft is set into its mid gear position $d_4$, no oil will be delivered to the engine cylinders.

In addition to the reversing features of the described valve gear, its toggle linkage element affords a further important advantage in that the timing or lead given the fuel injection into the engine cylinder may be varied to meet speed requirements while the engine is running.

Assuming the throw arm $62^a$ to be set into its actuating position $a_4$ as described in connection with Fig. 5, it will be seen that the intermediate pin $57^a$ when in its mean position $a_5$ has not as yet been shifted into its fully aligned toggle position $O_5$. Therefore a slight adjustment of the throw shaft as made with respect to its mean forward position $a_4$ will so constrain the movement of the intermediate toggle pin $57^a$ as to make it operate in a position that coincides more or less closely with the fully aligned toggle position $O_5$. As a result of such adjustment given to the throw shaft 63, the spindle arm $46^a$ will be correspondingly raised or lowered at the time the gear eccentric $52^a$ reaches its mid position $a_1$, and this in turn will advance or retard the time of fuel injection into the engine cylinder. In a similar manner, all of the engine cylinders may be simultaneously adjusted by the common throw shaft to advance or retard the fuel injection with respect to the individual dead centers of their respective crank throws.

In addition, the throw arm $62^a$ may be adjustably fastened to the throw shaft 63 by means of a set screw such as $64^a$ whereby the injection timing into any one cylinder may be varied to suit the needs for proper tuning of all the engine cylinders.

Referring now to the control means provided for regulating the oil discharge from the pump to the engine cylinders, each of the pump blocks $27^a$ and $27^b$, as is best shown in Fig. 2, is preferably equipt with a separate bypass control similar to the valve $65^a$. This spring closed valve is provided with a bypass valve seat $66^a$ formed in a recessed portion of the block $27^a$, which recess is placed in communication with the plunger bore and the rest of the pump chamber passages through the connecting passage $67^a$. The stem of the bypass valve $65^a$ is undercut below its seated head part so that when opened, it will freely vent the pump chamber pressure into the return pipe $68^a$, which pipe may if so desired, be connected to the supply pipe 95.

The stem of the bypass valve is also extended downward through the block $27^a$ and the free end of the stem is formed into a tit $69^a$ which engages with the floating lever $70^a$. One end of this lever rests upon the plunger drive collar $20^a$ and is reciprocated thereby, while the other lever end is fulcrumed in the stanchion $71^a$ by means of the pin $72^a$. This stanchion is slidably mounted in a portion of the bracket casting 10 and rests upon the control shaft 73 which is also slidably mounted in said casting and adapted to move normally with respect to the stanchion axis.

As shown in Fig. 1, the control shaft 73 is provided with an actuating pin 74 and also with a recessed cam face $75^a$ which is adapted to lift or lower the stanchion $71^a$ in accordance with the lateral adjustment given to the sliding control shaft 73. When the stanchion $71^a$ is raised to its maximum height the consequent early lifting of the bypass valve $65^a$ will cause the pressure in the pump chamber $35^a$ to break prior to the opening of the discharge valve $39^a$, and this in turn will prevent delivery of any oil from the pump block $27^a$.

On the other hand, a rightward movement imparted to the control shaft 73 will lower the stanchion and cause a delay in the opening of said valve, thus producing a corresponding increase in the pump delivery to its engine cylinder. It is preferred so to adjust the bypass controls that only a reasonable proportion of the total "kick" movement of the plungers will be utilized when working at the rated discharge capacity of the pump.

Referring now to Fig. 7, showing a diagrammatic assembly of the described fuel pump as applied to a two-stroke oil engine. A twin plunger cross-connected pump similar in all respects to that described and shown in Figs. 1 to 6 inclusive, and having discharge blocks $34^a$ and $34^b$ is designated by the letter $P_1$. A duplicate of such a pump provided with the corresponding discharge blocks $34^c$ and $34^d$, is designated by the letter $P_2$. The common or connected shaft 12 driving these two pump units is rotated from the crank shaft $76^a$ at engine speed through a lay shaft $80^a$ and a series of mitre gears $77^a$ and $78^a$. In the case of a two-stroke engine as shown in Fig. 7, the crank shaft may be of the two throw type having the opposed throws $T_1$ and $T_2$ which are intended to reciprocate their respective engine pistons in the power cylinders designated as $C_1$ and $C_2$, respectively.

Each such cylinder is provided with a check valve block $79_1$ and $79_2$, respectively, the functions of which will be explained more fully hereinafter. As indicated, each of the check valve blocks is separately piped to discharge directly into the fuel spray valve of its respective power cylinder. In order that the fuel pump units $P_1$ and $P_2$ may be utilized in both the forward and the reverse running directions of the engine, the forward discharge block $34^a$ of the pump $P_1$ is piped directly to the check valve block $79_1$ while the reverse discharge block $34^b$ of the pump $P_1$ is cross-connected with the check valve block $79_2$ of the other power cylinder. In like manner, the forward discharge block $34^c$ of the pump $P_2$ is piped directly to the check valve block $79_2$ while the reverse discharge block $34^d$ is cross-connected to the check valve block $79_1$.

As indicated in Fig. $7^a$, the respective plunger eccentric positions of the pump units $P_1$ and $P_2$ are preferably set in a quadrature relation to the opposed two-stroke engine cranks $T_1$ and $T_2$, that is to say the two aligned plunger eccentrics of the pump unit $P_1$ are set opposed to the two aligned eccentrics of the pump unit $P_2$.

When said fuel pump units are to be applied to a four-stroke oil engine, Fig. 8, diagrammatically represents the preferred pumping arrangement. A similar pair of pump units here designated as $P_3$ and $P_4$ are run at half-speed with respect to the four-stroke crank-shaft $76^b$ through the lay shaft $80^b$ and a series of reduction gears $77^b$ and $78^b$. The two-throw crank shaft is shown with aligned throws $T_3$ and $T_4$. In order to again utilize the pump units $P_3$ and $P_4$ in both their forward and reverse running directions, the discharge valve blocks shown in Fig. 8, are connected in a manner identical with that previously described for Fig. 7. Owing to the half speed of the drive shaft 12, it is however preferred to set the opposed plunger cranks $P_3$ and $P_4$ in the modified relation to the common crank-shaft throws $T_3$ and $T_4$ as is indicated in Fig. $8^a$. For this setting, the plunger actuating gear will still be moving at its maximum velocity at the time fuel is injected into the respective cylinders $C_3$ and $C_4$.

When the pump units are to be operated in the manner indicated in Fig. 7, the structural details and assembly of the pump parts as applied to a two-stroke multi-cylinder oil engine are shown in further detail in Figs. 9 to 13 inclusive. As stated, the discharge block $34^c$ delivers to the check valve block $79_2$ through the delivery pipe $50^c$ while the cross-connected pipe $50^b$ delivering from the block $34^b$ also discharges to the block $79_2$. A sectional detail of the block $79_2$ is shown in Fig. 13 and it will be seen that this block is provided with two opposed spring closed check valves $82^b$ and $82^c$, serving to check the back flow toward either of the pump units which may otherwise occur during the time of oil delivery through the respective pipes $50^b$ or $50^c$. These check valves discharge into a common passage $83^b$ which then communicates directly with the pipe $84^b$ which carries the fuel to the spray valve plug $81^b$. A further sectional detail of the plug $81^b$ is shown in Fig. 12. It is preferred to add an additional check valve $85^b$ close up to the spray nozzle $86^b$ so as to prevent the cylinder compression from blowing back into the delivery pipe line $84^b$. As applied to a large marine oil engine, the spray nozzle $86^b$ is preferably designed with a plurality of radially disposed nozzle holes $87^b$. When the proper pump discharge valve opens to deliver high pressure oil to these nozzle holes, they serve to atomize and distribute the fuel throughout the highly compressed air which at that instant is confined within the combustion space of the engine cylinder.

In further reference to the control means and interlocking devices provided therefor, it is pointed out that the single throw shaft 63 carrying a plurality of similar arms $62^a$, $62^b$, etc., for the various pump units, may be simultaneously adjusted through a set of spiral gears such as $88^a$ and $88^b$ shown in Figs. 9 to 11. The gear $88^b$ is mounted upon the counter shaft 89 upon which is also fixedly mounted the notched sector 90 provided with the stop lugs $90^a$ and $90^b$. Loosely fulcrumed on said shaft 89 is a bell-crank lever comprising a latched adjusting handle $91^a$ adapted to engage with said sector while the link arm $91^b$ of the bell-crank is pivoted to the link strap 92, which constitutes a toggle linkage for laterally shifting the connected control shafts 73. The worm gear 93 may be used for manually adjusting the countershaft 89 when it is desired to reverse the engine.

Any increment of rotary movement given to the shaft 89 will be imparted to the throw shaft 63 through the medium of the spiral gears $88^a$ and $88^b$. The interlocked sector 90 will likewise be carried with the shaft 89, and assuming the lever $91^a$ to be held in latched engagement, this will cause a similar movement to be imparted to the link strap 92. As the link strap is moved out of its mid or aligned position toward either of the extreme positions designated in Fig. 10, by the letters "X" and "Y", this will simultaneously draw the connected control shafts 73 of all the fuel pumps toward the toggle fulcrum 89. The consequent delay in the opening of the various pump bypass valves will correspondingly augment the pump delivery into the engine cylinders.

The handle 91$^a$ is normally to be so adjusted with respect to the sector 90 that the toggle link 92 will assume its mid or aligned position when the throw arms 62$^a$, 62$^b$, etc., are set in their mid gear position. For such setting all of the pump discharge valves will not only be closed but the pressure in all pump chambers will at the same time be broken whenever the reverse gear is set for or passes through its mid or stop position.

If after the worm gear 93 throws the counter shaft 89 into either its forward or reverse position and a change in the fuel adjustment should be needed by the engine cylinders, this may readily be accomplished within the limits of the stop lugs 90$^a$ and 90$^b$, by shifting the latch arm 91$^a$ to suit requirements. However should the reverse gear thereafter be turned back into its stop position, the toggle link 92 will in any event be brought back sufficiently close to its aligned position 20 to still break the pressure in all the fuel pumps.

Having thus described in detail the parts of the preferred embodiment of my invention, the manner in which said parts operate is as follows:

Assuming the pump parts to be in the position shown in Figs. 1 to 6 inclusive, and the engine running in the forward direction as indicated by the drive shaft arrow in Fig. 2, then the spring casing 16$^a$ will be moving upward. The eccentric 13$^a$ having reached its mid discharge stroke position indicated by "$a_1$" in Fig. 2, the plunger 29$^a$ will during its preceding stroke have sucked a charge of oil into the pump chamber 35$^a$ through the suction valve 33$^a$. During such suction stroke, the negligible resistance of the plunger packing allows the drive flange 19$^a$ to remain in substantially its balanced position with respect to the casing 16$^a$. As soon however as the eccentric 13$^a$ passes its lower or outer dead center position and begins to lift the casing 16$^a$, the resulting reversal of movement promptly closes the automatic suction valve 33$^a$, and thereafter this as well as all other pump valves normally remain closed until such time that the eccentric 13$^a$ has reached the said critical position $a_1$.

Since during the stated period, none of the oil is allowed to discharge from the pump chamber, the effect of such initial upward lifting of the casing 16$^a$ from its lower into mid stroke position, is to hold the driven plunger part 29$^a$ in a virtually stationary position (except for plunger slip) while the flange 19$^a$ is being displaced out of its balanced position against the combined resistance of the impulsion springs 23$^a$ and 25$^a$ by an amount of deflection indicated by the letter "K". Such maximum displacement of the impulsion drive parts occurring during the initial portion of each discharge stroke of the actuating gear, may be termed "plunger kick" and its action is essentially the same as that more fully explained in my copending patent application Serial No. 229,556. The described displacement of the drive parts, stores impulsion energy within said drive springs and it at the same time sets up a high initial hydraulic pressure throughout the pump chamber passages as well as behind both of the closed cross-connected main discharge valves 39$^a$ and 39$^b$.

As stated, the two plungers 29$^a$ and 29$^b$ working within the equalized pump blocks 27$^a$ and 27$^b$ respectively, are reciprocated in unison and perform identical functions. The object in using such twin plungers is to insure among other advantages, greater reliability against breakdown when working under high hydraulic pressure and also to facilitate the functioning of the impulsion drive springs. Furthermore in high pressure fuel pumps, their parts usually assume extremely massive proportions and become too heavy to be conveniently handled manually when making repairs or dismantling the working parts.

After the required amount of impulsion energy has been stored behind the respective plungers 29$^a$ and 29$^b$ in the manner described, then as the aligned plunger eccentrics 13$^a$ and 13$^b$ pass through the critical position "$a_1$", this will cause the valve gear to open the forward discharge valve 39$^a$ while the idling reverse discharge valve 39$^b$ will not be opened for a prescribed forward setting of the throw shaft 63, all as previously set forth in describing the action of the valve gear shown in Figs. 5 and 6.

Thus the opening of the forward discharge valve 39$^a$ is made to simultaneously control the release of the energy stored behind the pump plungers so as to allow both of them to be impelled forward with respect to the normal discharge stroke movement of their respective actuating gears. This action serves to materially accelerate the rate of pump discharge over that which the rigid actuating gear for the plunger drive could of itself produce during the fuel delivery period. It will be seen therefore, that the positive opening of the discharge valve at a time when the plunger actuating gear is traveling at or near its maximum velocity, superimposes the plunger "kick" movement thereon and that this allows of a far more rapid rate of pump delivery for any given speed of the actuating gear than could be attained without the support of the described impulsion drive.

The necessary storing of energy behind the plunger and its subsequent release are all effected during the discharge stroke of the actuating gear. In case the plunger were made integral instead of being provided with the intermediate resilient drive, then the rigid actuating gear parts could at best impart to the plunger only the limited "normal" or maximum mid stroke velocity, which in turn is entirely dependent upon the rotative speed of the actuating gear eccentric. It is the function of the impulsion drive to obviate this inherent limitation by superimposing a "kick" movement upon the plunger for the purpose of augmenting the "normal" rate of pump delivery at the time of fuel injection into the engine cylinder.

A further advantage of the impulsion drive resides in the fact that at slow running or starting speeds of the engine, the plunger displacement increment contributed by the actuating gear during the fuel injection period, may be reduced to negligible proportions since the impulsion drive alone is able to take care of the fuel requirements under such conditions. The fact that the rate of plunger displacement is not tied to that of the rigid actuating gear, allows the impulsion drive to maintain a high nozzle velocity and proper atomization at all running speeds of the engine. After the engine is brought up to full speed, the utilized increment of plunger "kick" may be lessened while the increment of actuating gear movement imparted to the plunger during the fuel injection period is made to contribute a correspondingly larger share in the gross pump delivery required by the engine.

Furthermore the fact that the relatively large amount of stored energy comes to bear upon the plunger during the fuel injection period, allows of working with a smaller sized pump plunger in relation to the engine cylinder bore. This materially reduces the maximum load imposed upon the parts, which parts in a high pressure fuel pump of this kind are likely in any event to become massive in structure. After the practical limit of such plunger size has been reached, the multiple or sectional pump construction herein set forth, readily permits such standard units to be manufactured more cheaply and then made up in any combination required to serve the largest of oil engine cylinders.

When applying the described method of superimposing the plunger "kick" upon the normal or maximum actuating gear movement to the case of a reversible multicylinder oil engine, the actuating gear eccentrics for each of the pump units are best set opposed as was pointed out in connection with Figs. 7 and 8. For the purpose of maneuvering such an engine, the usual air starting valves (not shown) may be employed to initially start the engine in its forward or reverse direction, and if desired, the control of such valves may readily be interlocked with the movements given to the countershaft 89 so as to be actuated in unison therewith.

Assuming that after the engine has been running in its forward direction with its throw arm 62$^a$ placed into the position $a_4$ as shown in Fig. 5, it should be desired to reverse the engine, this may be accomplished in the following manner:

The countershaft 89 is first turned back to bring the throw shaft 63 into its mid gear position which simultaneously causes the toggle link 92 to be moved out of its extreme position and into alignment as shown in Fig. 10, thereby breaking the pressure in all the fuel pump blocks by the resulting leftward movement given to the connected control shafts 73. At the same time both of the toggle valve gear linkages shown in Figs. 5 and 6, will then assume their respective mid gear positions in which neither the forward discharge valve 39$^a$ nor the reverse discharge valve 39$^b$ is opened.

In the event that the countershaft 89 is further turned so as to bring the throw arm 62$^a$ into its reverse position $g_4$, this will cause the bypass toggle link 92 to be moved into its reverse position such as is indicated by the letter "X" in Fig. 10. The interlocked movement of the throw shaft 63 will cause the reverse actuating valve gear parts shown in Fig. 6, to be shifted into their actuating position so as to operate the discharge valve 39$^b$, while the forward actuating valve gear parts shown in Fig. 5, will be shifted into their idling position so as not to open the discharge valve 39$^a$.

As a result of such changed positions in the reverse gear controls, the pump $P_1$ shown in Fig. 7, will now be made to deliver timed fuel injection to the cylinder $C_2$ through the cross-connected pipe 50$^b$ and a similar reversal of function will at the same time be brought about in the pump unit $P_2$ such that this will now be delivering fuel to the cylinder $C_1$ through the cross-connected pipe 50$^d$.

If after the engine has been set running on fuel in the reverse direction, it is desired to adjust its speed or otherwise change the quantity of fuel delivered to the various cylinders, this may readily be accomplished by correspondingly shifting the position of the fuel adjusting lever 91$^a$ with respect to the sector stop lugs 90$^a$ and 90$^b$, all without requiring a change in the position of the countershaft 89.

Thus it will be seen that by means of two fuel pump units provided with a suitable set of discharge valve controls and working from oppositely disposed actuating gear drives for their plungers as described, such pumps may be continuously utilized to deliver properly timed fuel injection to a pair of power cylinders running in either direction without need of a spare fuel pump for reversing purposes.

Lastly it is pointed out that the function of the check valves 82$^b$ and 82$^c$ as shown in Fig. 13, is to prevent the pump P$_1$ from blowing oil back into the chamber of the pump unit P$_2$, and vice versa. These check valves also permit one of the pump units to be cut out of service while the other remains in full operation. This may be accomplished by cutting out of service the particular pump in need of repairs by lifting its bypass valve sufficiently to break its chamber pressure for all positions of the reciprocating plunger. Thereafter any one of the valves of such pump may be removed and if necessary, the discharge pipe line leading to the check valve block may also be replaced without necessarily shutting down the engine. Such facility for making repairs together with the complete independence of the various pumping units required for serving a multicylinder oil engine, makes for safe and reliable operation in this vital adjunct. This is a matter of particular importance in the case of high pressure direct injection fuel pumps such as are now finding favor as applied to large marine engines.

It will be apparent that while a two cylinder engine has been chosen for illustrating an example of my invention, the same underlying principles apply equally well to an engine having any number of power cylinder pairs; when used for serving a three throw engine, similar results to those herein set forth may be attained by means of a three plunger pump having separate actuating eccentrics set in proper relation to such engine cylinder sequence.

In view of the cited modifications, it will be understood that I do not wish to be limited to the particular construction set forth in the given examples of my device, since various changes in structure and coordination of parts may be resorted to without departing from the spirit and scope of the present invention or destroying any of the advantages contained in the same, heretofore described and more particularly defined in the appended claims.

Claims.

1. In a fuel pump comprising a reciprocating actuating part and a driven plunger part, an impulsion drive acting between said parts, means for storing energy within said drive during the discharge stroke movement of the actuating part, control means including a discharge valve adapted to release said energy at or near mid stroke of the actuating part for the purpose of supplementing the normal rate of pump delivery while the actuating part is traveling at or near its maximum velocity, and means adapted to utilize only the initial portion of the impulsion stroke as the pump delivery through said discharge valve.

2. In a fuel pump comprising a reciprocating actuating part and a driven plunger part, an impulsion drive acting between said parts, means for storing energy within said drive during the discharge stroke movement of the actuating part, means including a discharge valve for releasing said energy for the purpose of superimposing an augmented plunger movement upon that which the actuating part of itself is capable of imparting to the plunger, and a bypass means adapted to interrupt the pump delivery through said discharge valve prior to the closure thereof.

3. In a fuel pump for a direct-injection internal combustion engine, comprising a reciprocating actuating part and a driven plunger part, an impulsion drive acting between said parts, means for storing energy within said drive during a portion of the discharge stroke movement of the actuating part, a discharge valve means controlling the fuel delivery to the engine cylinder and adapted to release said energy at or near mid stroke of the actuating part for the purpose of impelling the plunger forward to augment the normal rate of pump delivery into the engine cylinder, and a bypass means serving to interrupt the pump delivery through said discharge valve prior to the completion of the impulsion stroke.

4. In a fuel pump for an internal combustion engine, comprising a reciprocating plunger part and an actuating gear therefor, a discharge valve controlling the fuel delivery into the engine cylinder, means for opening said valve, means including an intermediary resilient drive between the plunger part and the actuating gear adopted to augment the normal rate of pump delivery subsequent to said discharge valve opening, and means serving to interrupt the pump delivery to the engine cylinder independently of the discharge valve closure.

5. In a fuel pump unit for a direct injection internal combustion engine, comprising a plurality of reciprocating actuating parts and driven plunger parts therefor, an impulsion drive acting between each of the respective actuating and plunger parts, means for storing energy within said drives during the discharge stroke movement of the actuating parts, a common discharge valve controlling the fuel delivery to the engine cylinder and adapted to release said energy and allow all of said plungers to be impelled onward simultaneously for the purpose of augmenting the normal rate of the combined pump delivery into the engine cylinder.

6. In a reversible fuel pump comprising a reciprocating part and a driven plunger part with an impulsion drive acting between said parts, means for storing energy within said drive during each discharge stroke movement of the actuating part, a forward and a reverse discharge valve each adapted to independently control the release of said energy, and a valve gear means for selectively opening either of said valves in unison with the movement of the actuating part.

7. In a reversible fuel pump comprising an actuating part reciprocated by a rotating eccentric and a driven plunger part with an impulsion drive acting between said parts, means for storing energy within said drive during the discharge stroke movement of the actuating part, a discharge valve adapted to release said energy when the eccentric rotates in one direction, a second independent discharge valve adapted to release said energy when the eccentric rotates in the opposite direction, and a valve gear means for selectively opening one or the other of said discharge valves.

8. In a fuel pump comprising a plurality of plungers, an actuating gear for reciprocating said plungers in unison, an independent pump chamber and a suction valve for each of said plungers, means establishing communication between the various pump chambers, a positively opened discharge valve, a nozzle, and means including a common conduit leading from the discharge valve for directing the combined pump delivery to said nozzle.

9. In a fuel pump comprising a plurality of plungers, an actuating gear for reciprocating said plungers in unison, an independent pump chamber and a suction valve for each of said plungers, means establishing communication between the various pump chambers, a positively opened discharge valve, a nozzle, means including a common conduit leading from the discharge valve for directing the combined pump delivery to said nozzle, and means including a by-pass device for interrupting the pump chamber pressure and regulating the pump delivery sent forth to said nozzle.

10. In a reversible fuel pump unit serving a multicylinder direct-injection oil engine having a set of opposed engine cranks and cylinder appurtenances therefor, said pump unit comprising two reciprocating plungers each provided with independent pump chambers, opposed actuating gears for said plungers, a forward and a reverse discharge valve for each of said pump chambers, means for opening said discharge valves, a set of independent forward distributing pipes, one such connecting the forward discharge valve of one pump chamber for delivery into one of said engine cylinders and the other pipe connecting the forward discharge valve of the other pump chamber for delivery into the other engine cylinder; a set of independent reverse distributing pipes, one such cross-connecting the reverse discharge valve of the first named pump chamber with the last named engine cylinder and the other pipe cross-connecting the reverse valve of the last named pump chamber with the first named engine cylinder, and control means for selectively opening either the forward set of valves or the reverse set of valves in unison with the respective forward or reverse movement imparted to said engine cranks.

11. In a reversible fuel pump unit serving a multicylinder direct injection oil engine having a set of opposed engine cranks and cylinder appurtenances therefor, said pump unit comprising two reciprocating plungers each provided with independent pump chambers, opposed actuating gears for said plungers, a forward and a reverse discharge valve for each of said pump chambers, means for opening said discharge valves, a set of independent forward distributing pipes, one such connecting the forward discharge valve of one pump chamber for delivery into one of said engine cylinders and the other pipe connecting the forward discharge valve of the other pump chamber for delivery into the other engine cylinder; a set of independent reverse distributing pipes, one such cross-connecting the reverse discharge valve of the first named pump chamber with the last named engine cylinder and the other pipe cross-connecting the reverse valve of the last named pump chamber with the first named engine cylinder, control means for shifting the respective delivery of said plungers from one to the other of said engine cylinders, and means for discontinuing the pump delivery to both of said cylinders when the engine is to be brought to rest and made inoperative.

12. In a reversible fuel pump unit serving a multicylinder direct-injection oil engine having a set of opposed engine cranks and cylinder appurtenances therefor, said pump unit comprising two reciprocating plungers each provided with independent pump chambers, opposed actuating gears for said plungers, a forward and a reverse discharge valve for each of said pump chambers, means for opening said discharge valves, a separate check valve block for each of said engine cylinders and respectively delivering fuel thereto, a set of independent forward distributing pipes, one such connecting the forward discharge valve of one pump chamber with one of said check valve blocks and the other pipe connecting the forward discharge valve of the other pump chamber with the other check valve block; a set of independent reverse distributing pipes, one such cross-connecting the reverse discharge valve of the first named pump chamber with the last named check valve block and the other pipe cross-connecting the reverse discharge valve of the last named pump chamber with the first named check valve block, and control means for shifting the delivery of said pump plungers from one to the other of said check valve blocks.

13. In a reversible fuel pump serving a direct-injection oil engine with cylinder appurtenances therefor, said pump comprising two reciprocated plungers each provided with independent pump chambers, opposed crank mechanisms for reciprocating said plungers in unison with the engine piston movements, a controlled forward delivery valve for one of said pump chambers and a controlled reverse delivery valve for the other chamber, a check valve block said block having two opposed check valves discharging into a common connection leading to the engine cylinder, a distributing pipe connecting the forward valve with one of said check valves and another distributing pipe connecting the reverse valve with the other of said check valves, and means for selectively opening either the forward or the reverse delivery valve to meet the respective fuel injection requirements for forward or reverse running of the engine.

14. In a reciprocating fuel pump comprising a chamber, a plunger and a puppet discharge valve for said chamber, a rocking spindle provided with means intermediate the ends thereof for opening said valve against chamber pressure, a valve block for mounting said spindle, a hydraulic packing means for one end portion of the spindle sealing same with respect to said block, a seat formed at the other end portion of said spindle also making a movable hydraulic joint with respect to said block, and means for actuating said spindle.

15. In a reciprocating fuel pump comprising a chamber, a plunger and a puppet discharge valve for said chamber, an actuating spindle provided with means intermediate the ends thereof for opening said valve against chamber pressure, a removable valve block for mounting said spindle, hydraulic packing means for each end portion of said spindle to seal same with respect to the valve block, and means including a rocker arm for actuating said spindle.

16. In a reciprocating fuel pump comprising a chamber, a plunger and a main discharge valve, a pilot valve for said discharge valve, an actuating means including an oscillating spindle adapted to successively open the pilot valve and the main discharge valve against chamber pressure, and a removable valve block for mounting said spindle.

17. In a fuel pump for an internal combustion engine comprising a reciprocating plunger and a discharge valve delivering to the engine cylinder, a rock-shaft adapted to positively opening said valve, a rocker arm for said shaft, a toggle link gear for actuating said arm, and control means for changing the time of opening said valve while said gear operates in unison with the plunger movements.

18. In a fuel pump unit for a direct-injection internal combustion engine comprising a plurality of plungers, a separate pump chamber for each of said plungers, a discharge valve for each of said chambers, means including a rocker arm and an actuating toggle link for positively opening each of said valves, and control means for adjusting said toggle to simultaneously change the time of opening of said valves while the engine is in operation.

19. In a fuel pump for an internal combustion engine comprising a reciprocating actuating part and a driven plunger part with an impulsion drive acting between said parts, means for storing energy within said drive during each discharge stroke movement of the actuating part, a positively opened discharge valve delivering to the engine and adapted to release said energy, a valve gear including a rocker arm and a toggle link for actuating said valve, and control means for adjusting said toggle to change the time of opening said valve while its gear operates in unison with the plunger actuating part.

20. In a fuel pump having a reciprocating plunger and a chamber, a puppet valve for said chamber, a rockshaft adapted to periodically open said valve, a rocker arm for said shaft, a toggle linkage for actuating said rockshaft comprising a link pivoted to said rocker arm and a toggle arm pivoted to the other end of said toggle link, means for guiding the free end of said toggle arm and for reciprocating same in unison with the plunger movements, a guide link constraining the movement of said toggle linkage and adapted to adjustably set said linkage with respect to its aligned position for the purpose of altering the time of opening said puppet valve.

21. In a fuel pump having a reciprocating plunger and a chamber, a puppet valve for said chamber, a rockshaft adapted to positively open said valve, a rocker arm for said shaft, a toggle linkage for actuating said rockshaft comprising a toggle link pivoted to said rocker arm and a toggle arm pivoted to the other end of said toggle link, means for guiding the free end of said toggle arm and for reciprocating same in unison with the plunger movements, a guide link constraining the movement of the toggle linkage, a throw shaft in operative connection with said guide link, and control means for adjustably setting said throw shaft to shift the position of the toggle linkage with respect to its aligned position.

22. In a fuel pump having a reciprocating plunger and a chamber therefor, a puppet valve for said chamber, a rockshaft adapted to positively open said valve, a rocker arm for said shaft, a toggle linkage for actuating said rockshaft comprising a toggle link pivoted to said rocker arm and a toggle arm pivoted to the other end of said link, means for guiding the free end of said toggle arm and for reciprocating same in unison with the plunger movements, a guide link constraining the movement of the toggle linkage, and a throw shaft in operative connection with said guide link serving on the one hand to throw said linkage toward its aligned position for the purpose of periodically opening said puppet valve, and on the other hand to pull the toggle linkage out of alignment into its idling position so as to stop opening said valve.

23. In a reversible fuel pump having a reciprocating plunger and a chamber therefor, a forward and a reverse valve for said chamber, a separate toggle linkage for each of said valves, means for independently actuating said linkages in unison with the plunger movements, guide links constraining the movement of the respective toggle linkages and adapted to shift said linkages into or out of engagement with their respective valves, and control means for selectively shifting said toggle linkages into their correlated forward or reverse positions in which respective positions one of said valves is periodically opened while the other is disengaged.

24. In a reversible fuel pump having a reciprocating plunger and a chamber therefor, a forward and a reverse valve for said chamber, a separate toggle linkage for each of said valves, means for actuating said linkages in unison with the plunger movements, guide links constraining the movement of the respective toggle linkages and adapted to shift said linkages into or out of engagement with their respective valves, a throw shaft for selectively shifting said toggle linkages into either their forward or their reverse positions in which positions one of said valves is periodically opened while the other is disengaged, and means for disengaging both of said linkages when the throw shaft assumes a position intermediate its forward and its reverse positions.

25. In a fuel pump for an internal combustion engine, said pump having a reciprocating plunger and a chamber therefor, a set of separate discharge valves for said chamber each adapted to independently deliver fuel to the engine, a valve gear for actuating said valves in unison with the plunger movements, said gear being provided with means for disengaging either of said delivery valves, a shifting means for selectively throwing one or the other of said discharge valves into engagement with said gear, an adjustable bypass means for interrupting the delivery through such actuated valve, and control means for interlocking said bypass adjusting means with said shifting means.

26. In a fuel pump for an internal combustion engine, said pump having a reciprocating plunger and a chamber therefor, a set of separate discharge valves for said chamber each adapted to independently deliver fuel to the engine, a valve gear for actuating said valves in unison with the plunger movements, said gear being provided with means for disengaging either of said discharge valves, a shifting means for selectively throwing one or the other of said discharge valves into engagement with said gear, a bypass valve for interrupting the pump delivery through such actuated valve, a toggle adjusting means for said bypass valve adapted to completely bypass said pump delivery when the toggle assumes its alinged position, and control means for interlocking said toggle adjusting means with said shifting means.

27. In a fuel pump for an internal combustion engine, said pump having a reciprocating plunger and a chamber therefor, a set of separate discharge valves for said chamber each adapted to independently deliver fuel to the engine, a valve gear for actuating said valves in unison with the plunger movements said gear being provided with means for disengaging either of said discharge valves, a shifting means for selectively throwing one or the other of said valves into engagement with said gear, an adjustable bypass means for interrupting the pump delivery through such actuated valve, control means for normally interlocking said bypass adjusting means with said shifting means, and a disengaging means for said interlocked control means whereby the fuel delivery to said engine may be independently adjusted while said shifting means remains thrown into engagement with one or the other of said discharge valves.

28. In a fuel pump having a reciprocating plunger and a chamber therefor, a discharge valve, a valve gear for actuating said valve in unison with the plunger movements said gear being provided with a disengaging means, a shifting means for throwing said gear into or out of engagement with said valve, an adjustable bypass means for interrupting the pump delivery, and control means for interlocking said bypass adjusting means with said shifting means.

29. In a fuel pump comprising a plunger, a suction and a discharge valve, a pump block provided with a recessed chamber, a removable valve block enclosing said chamber recess and adapted to mount the discharge valve together with an actuating spindle therefor, means for fastening the valve block to the pump block, a cross-head means adapted to reciprocate the plunger, a guide structure for said cross-head means, and means including a stanchion for fastening the pump block to said guide structure.

In testimony whereof, I have hereunto set my hand this 27th day of April, 1922.

LOUIS ILLMER.

Witnesses:
M. E. ALEXY,
W. B. CARUTHERS.